UNITED STATES PATENT OFFICE.

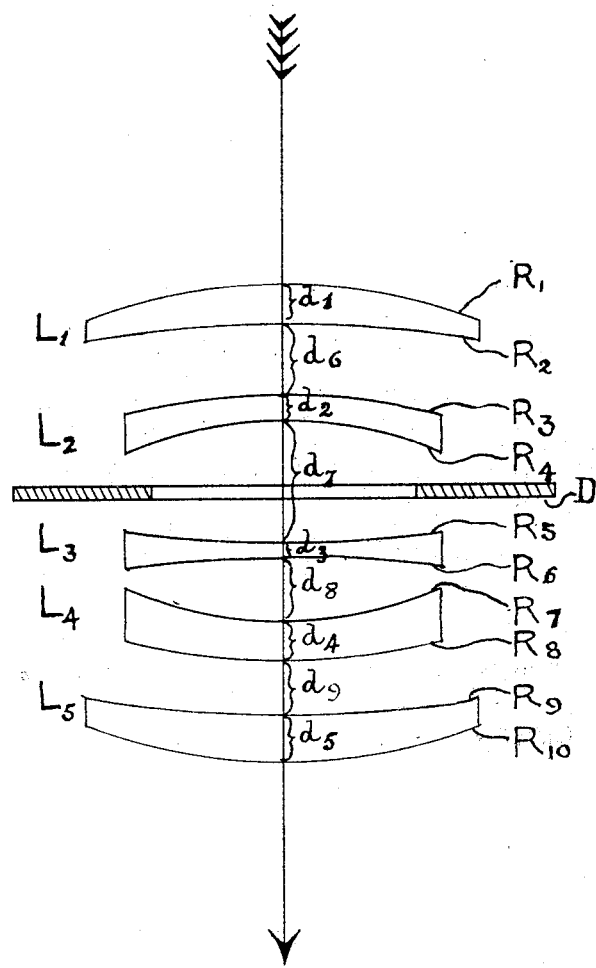

CONRAD BECK AND HORACE C. BECK, OF LONDON, ENGLAND.

PHOTOGRAPHIC LENS.

No. 871,559.   Specification of Letters Patent.   Patented Nov. 19, 1907.

Application filed May 7, 1907. Serial No. 372,309.

*To all whom it may concern:*

Be it known that we, CONRAD BECK and HORACE COURTHOPE BECK, subjects of the King of Great Britain, residing at London, England, have invented new and useful Improvements in Photographic Lenses, of which the following is a specification.

This invention relates to a lens for photographic purposes, in which the chromatic, spherical and oblique, astigmatic, and other errors, are corrected by a novel method.

Our invention consists of the combination of two positive and three negative lenses, with air spaces between each lens, arranged in two combinations. One of the combinations consists of two meniscus lenses, the outer one being positive and the inner one negative. The other combination consists of three lenses, one of which is a positive meniscus, another of which is a double concave negative lens, and the third of which is a meniscus negative lens. The two combinations are of greatly different focal power when used alone, and the perfect correction is only obtained by using the two combinations together, each of the five lenses being essential to perfect optical performance. The air spaces between the lenses are of the shape of two negative meniscus lenses and of two positive lenses. The two meniscus shaped air spaces are nearest the outside of the lens, the two positive air spaces are in the interior of the lens.

The three negative lenses are constructed of glasses one of which has a greater refractive index and dispersion than the positive lenses, another has a smaller refractive index and greater dispersion than the positive lenses, while the third has a smaller refractive index and a lower or approximately the same dispersion as the positive lenses. The positive lenses ($L_1$ and $L_5$) are made of a barium crown with relatively high refraction. The meniscus lens $L_2$ used as the negative element of the combination, which consists of a pair of lenses $L_1$ $L_2$, is constructed of a dense silicate flint glass, while in the combination which consists of three lenses, the negative meniscus lens $L_4$ is constructed of a light silicate flint, and the other negative lens $L_3$ is constructed of a silicate crown.

By careful calculation of the curves and separations of a series of five lenses arranged in this manner, an objective can be constructed which is unusually well corrected for the errors of central spherical and chromatic aberration, and at the same time is corrected for astigmatism and oblique spherical aberration for a very large angle of view. Our invention enables us to construct an objective of this type with lenses whose individual powers are all very low, the initial aberrations of which are comparatively small and therefore the complete lens is not so sensitive to small variations in the thickness of the lenses and air spaces as those in which individual lenses of higher power are employed.

The drawing, which is diagrammatic, shows the optical portions of a lens constructed according to our invention and the arrow indicates the direction of light through the lens system.

$L_1$ $L_2$ $L_3$ $L_4$ $L_5$ represent the five lenses, the lens $L_1$ being furthest from the photographic plate.

$R_1$ $R_2$ $R_3$ ...... $R_{10}$ represent the radii of curvature of the various surfaces.

The central thicknesses of the 5 lenses are denoted by the letters $d_1$ $d_2$ $d_3$ $d_4$ $d_5$ respectively.

The axial thickness of the air space between the lenses $L_1$ and $L_2$ is denoted by $d_6$, that between $L_2$ and $L_3$ by $d_7$, that between $L_3$ and $L_4$ by $d_8$, that between $L_4$ and $L_5$ by $d_9$.

We append below the optical data for constructing a lens according to our invention, the focal length being 10 inches and the effective aperture about one eighth of the focus.

| Radius of curvature in inches. | Glass constants. | Thicknesses of lenses & airspaces in inches. | |
|---|---|---|---|
| $R_1 = +2.19$ | Barium crown $\mu_0 = 1.6065$ $\nu = 58.1$ | $d_1$ | .18 |
| $R_2 = +7.4$ | | | |
| | | $d_6$ | .236 |
| $R_3 = +2.69$ | Dense silicate flint $\mu_0 = 1.6193$ $\nu = 37.4$ | $d_2$ | .097 |
| $R_4 = +1.62$ | | | |
| | | $d_7$ | .569 |
| $R_5 = -29.7$ | Silicate crown $\mu_0 = 1.5193$ $\nu = 58.7$ | $d_3$ | .076 |
| $R_6 = +35.3$ | | | |
| | | $d_8$ | .118 |
| $R_7 = -1.59$ | Light silicate flint $\mu_0 = 1.5703$ $\nu = 41.1$ | $d_4$ | .139 |
| $R_8 = -2.705$ | | | |
| | | $d_9$ | .215 |
| $R_9 = -7.4$ | Barium crown $\mu_0 = 1.6065$ $\nu = 58.1$ | $d_5$ | .18 |
| $R_{10} = -2.19$ | | | |

The Greek letter $\nu$ used above represents the dispersion of the glass.

Alterations in the above data and constants may be made without departing from the principle of our invention.

It will be evident that the crown $R_6$ is capable of alteration to a flat surface, or even a slightly convex curve, by suitable modification of the refractive powers of the various glasses. In a similar manner, $R_2$ and $R_3$ may be made either flat or slightly convex, and we do not limit ourselves to the above arrangement of the refractive indices. It is a well known fact that the oblique spherical corrections of a lens are very rapidly affected by the shapes of the individual lenses, and in our invention the essential feature lies in the general shapes of the lenses combined with the dispersive ratios of the four most powerful lenses. Considerable variation in the refractive indices may be made, the necessary compensation being made by slight variations in the focal powers and separations of the individual lenses, without departing from the general shape. As an instance of this, lens $L_2$ may be made of a glass with a refractive index of 1.64, and the compensating alteration in the curvature required will be that the curve $R_3$ should equal 2.8 inch and the curve $R_4$ should equal 1.64 inch, combined with a slight alteration in the distance apart of the surfaces. As another instance, the refractive indices and curves of lenses $L_2$ and $L_4$ may be interchanged and the compensating corrections made by altering the distances between the surfaces and altering the power of lens $L_3$. D is a diaphragm arranged between the two combinations.

What we claim as our invention, and desire to secure by patent, is:—

1. A compound photographic lens spherically, chromatically and astigmatically corrected, consisting of two positive and three negative lenses, all separated by air spaces, two of which air spaces are of the shape of a positive lens and two of which are of the shape of a negative lens, the two more powerful of the three negative lenses being meniscus shaped and being made of a glass with greater dispersive power than that used in the positive lenses, the curvature of the positive lenses facing the negative lenses being very slight.

2. A compound photographic lens spherically, chromatically and astigmatically corrected, consisting of two positive and three negative lenses, all separated by air spaces, two of which air spaces are of the shape of a positive lens and two of which are of the shape of a negative lens, the lenses being arranged in two combinations with a diaphragm between them, one combination consisting of a meniscus positive lens and a meniscus negative lens, the latter having a higher dispersion and a higher refractive index than the meniscus positive lens, the other combination consisting of a meniscus positive lens and two negative lenses, one at least of which latter is meniscus, both of which have a higher refractive index than the meniscus positive lens, and one of which has a higher dispersion and the other approximately the same or a lower dispersion than the meniscus positive lens, substantially as described.

In witness whereof we have hereunto set our hands in presence of two witnesses.

CONRAD BECK,
HORACE C. BECK.

Witnesses:
WM. GIRLING,
ALFRED T. PATTEN.